United States Patent [19]

Marx et al.

[11] Patent Number: 5,982,964
[45] Date of Patent: Nov. 9, 1999

[54] PROCESS FOR FABRICATION AND INDEPENDENT TUNING OF MULTIPLE INTEGRATED OPTICAL DIRECTIONAL COUPLERS ON A SINGLE SUBSTRATE

[75] Inventors: Jeffrey M. Marx, Simsbury; Robert W. Ade, Bolton; Jack Lin, West Hartford, all of Conn.

[73] Assignee: Uniphase Corporation, San Jose, Calif.

[21] Appl. No.: 08/885,428

[22] Filed: Jun. 30, 1997

[51] Int. Cl.⁶ .................................................. G02B 6/132
[52] U.S. Cl. .............................. 385/42; 385/50; 385/132; 427/163.2
[58] Field of Search .................................. 385/42, 39–50, 385/129–132; 427/163.2

[56] References Cited

U.S. PATENT DOCUMENTS

| | | | |
|---|---|---|---|
| 4,284,663 | 8/1981 | Carruthers et al. | 264/1.24 |
| 4,953,939 | 9/1990 | Epworth et al. | 359/173 |
| 4,984,861 | 1/1991 | Suchoski, Jr. et al. | 385/2 |
| 5,026,137 | 6/1991 | Tokumitsu | 385/24 |
| 5,042,898 | 8/1991 | Morey et al. | 385/37 |
| 5,077,816 | 12/1991 | Glomb et al. | 385/37 |
| 5,107,360 | 4/1992 | Huber | 359/124 |
| 5,115,338 | 5/1992 | DiGiovanni et al. | 359/337 |
| 5,119,447 | 6/1992 | Trisno | 385/3 |
| 5,134,620 | 7/1992 | Huber | 372/6 |
| 5,140,456 | 8/1992 | Huber | 359/341 |
| 5,148,503 | 9/1992 | Skeie | 385/3 |
| 5,151,908 | 9/1992 | Huber | 372/6 |
| 5,153,762 | 10/1992 | Huber | 359/125 |
| 5,159,601 | 10/1992 | Huber | 372/6 |
| 5,166,821 | 11/1992 | Huber | 359/238 |
| 5,168,534 | 12/1992 | McBrien et al. | 385/3 |
| 5,187,760 | 2/1993 | Huber | 385/37 |
| 5,191,586 | 3/1993 | Huber | 372/6 |
| 5,200,964 | 4/1993 | Huber | 372/26 |
| 5,208,819 | 5/1993 | Huber | 372/32 |
| 5,210,631 | 5/1993 | Huber et al. | 359/132 |
| 5,210,633 | 5/1993 | Trisno | 359/194 |
| 5,222,089 | 6/1993 | Huber | 372/26 |
| 5,231,529 | 7/1993 | KAede | 359/124 |
| 5,243,609 | 9/1993 | Huber | 372/19 |
| 5,257,124 | 10/1993 | Glaab et al. | 359/124 |
| 5,257,125 | 10/1993 | Maeda | 359/196 |
| 5,260,823 | 11/1993 | Payne et al. | 359/341 |

(List continued on next page.)

FOREIGN PATENT DOCUMENTS 2 295 247   11/1996   United Kingdom .

OTHER PUBLICATIONS

"Photoinduced Bragg Gratings In Optical Fibers" by William W. Mopey, Gary A. Ball and Gerald Meltz, Optics & Photonics News, Feb. 1994, 7 sheets.

Catalog of Integrated Optical Circuits, Uniphase Telecommunications Products, Electro–Optics Products Division, 1997, no month.

"Piriodical" A Publication of Photonic Integration Research, Inc., No. 12, Feb. 1997.

Literature regarding "AOTFS route traffic in WDM networks", Lightwave, Jun. 1996.

*Primary Examiner*—Rodney Bovernick
*Assistant Examiner*—Ellen E. Kang
*Attorney, Agent, or Firm*—McCormick, Paulding & Huber LLP

[57] ABSTRACT

A method of fabricating an optical device incorporates two different techniques for formation of different structures of the device on the same substrate. Individual processes such as Titanium indiffusion and annealed proton exchange in $LiNbO_3$ require significantly different temperature ranges for comparable waveguide formation. The present method combines these processes and allows for temperature tuning of the optical parameters of passive and active components, for instance coupling lengths of directional couplers, associated with one section of the device without altering the optical parameters of similar components in the other sections. The process improves yield for devices which employ more than one precisely fabricated optical directional coupler by creating an extra degree of process freedom.

16 Claims, 2 Drawing Sheets

U.S. PATENT DOCUMENTS

| | | | |
|---|---|---|---|
| 5,268,910 | 12/1993 | Huber | 372/6 |
| 5,271,024 | 12/1993 | Huber | 372/6 |
| 5,283,686 | 2/1994 | Huber | 359/337 |
| 5,504,609 | 4/1996 | Alexander et al. | 359/125 |
| 5,579,143 | 11/1996 | Huber | 359/130 |
| 5,608,825 | 3/1997 | Ip | 385/24 |
| 5,627,848 | 5/1997 | Fermann et al. | 372/18 |
| 5,633,748 | 5/1997 | Perez et al. | 359/325 |
| 5,636,301 | 6/1997 | O'Sullivan et al. | 385/24 |
| 5,638,473 | 6/1997 | Byron | 385/37 |
| 5,875,276 | 2/1999 | Mahapatra et al. | 385/132 |

PROCESS FOR FABRICATION AND INDEPENDENT TUNING OF MULTIPLE INTEGRATED OPTICAL DIRECTIONAL COUPLERS ON A SINGLE SUBSTRATE

CROSS REFERENCE TO RELATED APPLICATIONS

Some of the matter contained herein is disclosed and claimed in the commonly owned U.S. patent application Ser. No. 08/885,449, is now abandoned, entitled "Method and Apparatus For Dynamically Equalizing Gain In An Optical Network" (Attorney Docket No. 4827-11); U.S. patent application Ser. No. 08/885,427, is now allowed entitled "Loop Status Monitor For Determining The Amplitude Of The Signal Components Of A Multi-Wavelength Optical Beam" (Attorney Docket No. 4827-13) and U.S. patent application Ser. No. 08/884,747, is now allowed, entitled "Dynamic Optical Amplifier" (Attorney Docket No. 4827-14) all of which are incorporated herein by reference.

FIELD OF THE INVENTION

The present invention relates to methods for fabricating optical waveguides, and specifically to methods for fabricating a plurality of optical waveguides on a single substrate for use in integrated optical modulators.

BACKGROUND OF THE INVENTION

Active and passive devices employing optical waveguides for use in communication networks are well known in the art and include device structures which incorporate multiple precisely fabricated optical directional couplers on a single integrated optical substrate. Modulators fitting this description are available commercially for distribution of analog signals over optical fiber, notably for community access television (CATV). These devices are typically formed on a substrate by diffusion of a prescribed material into a substrate. A single substrate may include a plurality of optical waveguide sections and integrated optical directional couplers. An integrated optical directional coupler is formed when two parallel optical waveguides are situated such that their evanescent mode fields overlap. Coupling efficiency is optimized under synchronous coupling conditions which occur when individual single mode waveguide propagation constants are matched. The "interaction length" required for complete coupling of optical power from one optical waveguide to an adjacent optical waveguide is known as the coupler length, L, where $L=\pi/2K$. K is known as the "overlap Integral". The overlap integral and coupler length depend strongly on the device's optical parameters. In fact, the experimental dependence of L (and K) upon waveguide gap separation ("g"), which is determined by fabrication parameters, such as diffusion time ("t") and temperature ("T"), is well known in the art and described in, for example, "Guided Wave Optics", by H. F. Taylor and A. Yariv, *Proc. of the IEEE*, vol. 62, no. 8, August 1974, incorporated herein by reference as part of the present disclosure.

This dependence unfortunately makes the fabrication of integrated optical directional couplers highly sensitive to the specific values of these parameters. An improperly formed integrated optical directional coupler may reduce the performance of an optical device by, for example, contributing nonlinearities. However, attempting to adjust the characteristics of such waveguides using traditional methods involves altering those same parameters in all waveguide sections on the substrate. The simultaneous diffusion, and thus simultaneous formation of both waveguide sections, makes it difficult to precisely and repeatably form more than one optical directional and couplers on the same substrate. Accordingly, production yields for such a device are often lower than desirable. For example, production yield, A, for a device structure incorporating two optical directional couplers would be proportional to the product of the individual coupler fabrication yields, a, so that $A \approx a^2$, where a $\leq 1.0$.

Waveguides formed by known processes are also susceptible to optical input power having a component with improper polarization. Such an improper polarization can result from, for example, fiber pigtail misalignment, and affects the linear electro-optic affect typically used to induce a modulating refractive index change. Thus, optical input power with an improperly-polarized component may introduce noise into an optical device using the waveguide, and degrade the performance thereof.

As noted, a single process has been used to create the entire optical waveguide device architecture on an individual substrate, including all optical directional couplers. Two such patented processes are U.S. Pat. No. 4,284,663, entitled "Fabrication Of Optical Waveguides By Indiffusion Of Metals" which discloses titanium indiffusion in $LiNbO_3$ and U.S. Pat. No. 4,984,861 entitled "Low-Loss Proton Exchanged Waveguides For Active Integrated Optic Devices And Method Of Making the Same. The '861 patent discloses an annealed proton exchange (APE) process in $LiNbO_3$.

Patents which relate to device architectures including multiple directional couplers are U.S. Pat. No. 5,148,503, "Apparatus And Method For Linearized Cascade Coupling Integrated Optical Modulator", and U.S. Pat. No. 5,168,534 for "Cascaded Optic Modulator Arrangement". Examples of relevant journal publications are H. Skeie and R. V. Johnson, "Linearization of electrooptic modulators by a cascade coupling of phase modulating electrodes", *Integrated Optical Circuits*, vol. SPIE-1543, pp. 153–164, 1991 and W. K. Burns, "Linearized optical modulator with fifth order correction", *J. Lightwave Technology*, vol. 13, no. 8, August 1995. All of the foregoing patents and publications are incorporated herein by reference.

Accordingly, it is an object of the present invention to provide a method for fabricating a plurality of optical waveguides on a single substrate which does not suffer the above drawbacks.

An object of the present invention is to provide a process which yields an improvement in the fabrication yield of integrated optical modulators, including those devices designed primarily for communications that require multiple optical directional couplers on a single substrate.

Another object of the present invention is to provide a method of the foregoing type which allows for an adjustment in the values of device parameters between first and second optical waveguides on a single substrate.

Still another object of the present invention is to provide a method of fabricating an optical device of the foregoing type utilizing two, non-simultaneous diffusion steps.

Yet another object of the present invention is to provide a method of fabricating an optical device of the foregoing type capable of filtering signals having an undesirable polarization from a received optical beam.

Still another object of the present invention is to provide a method of fabricating an optical device of the foregoing type that interfaces adjacent optical structures formed from disparate diffusion processes, thereby optically "stitching" the structures to one another.

SUMMARY OF THE INVENTION

In accordance with the present invention, a method for fabricating, on a substrate, a plurality of optical devices adapted to receive an optical beam, with each optical device defined by a plurality of optical parameters, which are determined by fabrication parameters such as waveguide gap separation ("g"), diffusion time ("t") and diffusion temperature ("T"). The method includes the steps of diffusing a first material at a first temperature into a first portion of the substrate to define a first guide for the optical beam. The first material diffuses significantly into the substrate only at temperatures comparable to, or greater than the first temperature. The method also includes the step of diffusing a second material into a second portion of the substrate at a second temperature to define a second guide for the optical beam. The second temperature is substantially less than the first temperature such that approximately none of the first material in the substrate continues to diffuse while the second material diffuses into the substrate.

Also in accordance with the present invention, the foregoing method includes the step of diffusing Titanium into the substrate as the first material and also comprises an annealed proton exchange process for diffusing Hydrogen into the substrate as the second material.

According to another aspect of the present invention, the optical beam includes a plurality of optical components each having a polarization, including a preferred polarization. The present method further comprises the step of attenuating in the second waveguide all of the optical components other than the optical component having the preferred polarization.

According to still another aspect of the present invention, the foregoing method includes the step of defining the second substrate portion of the substrate to be adjacent the first substrate portion and to receive the optical beam directly from the first waveguide so that the boundary between the first and second substrate portions bisects one or more of the optical devices which can be optical directional couplers.

According to yet another aspect of the present invention, the foregoing method includes the step of defining the second substrate portion of the substrate to be adjacent the first substrate portion and to receive the optical beam substantially simultaneously with the first waveguide so that the boundary between the first and second substrate portions is placed in between discreet optical devices which can be optical directional couplers.

DETAILED DESCRIPTION OF THE PREFERRED EMBODIMENTS

Figure 1:
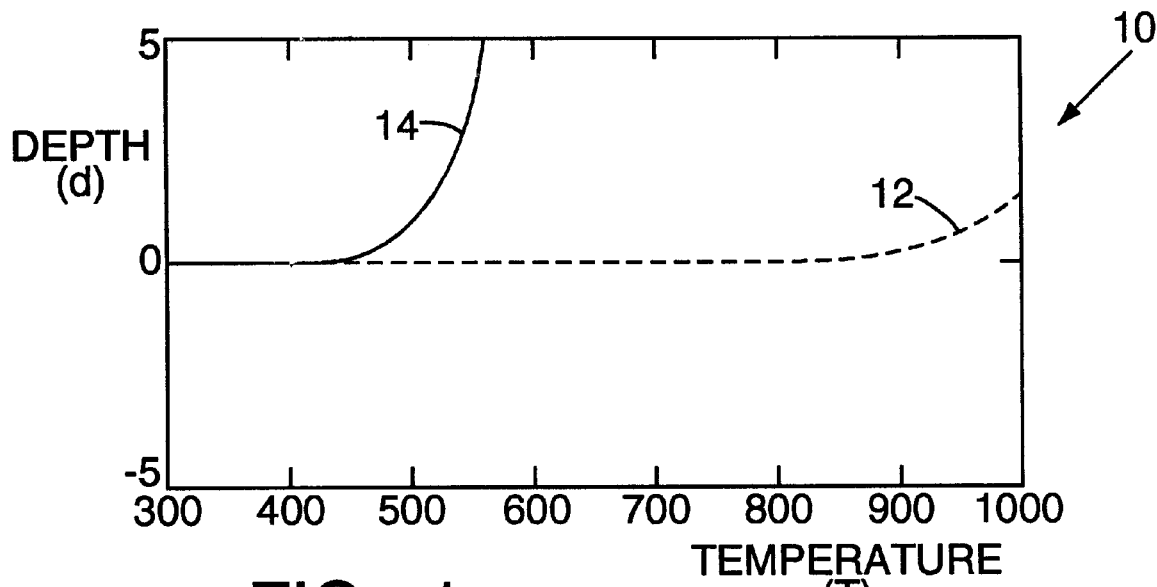
FIG. 1 is a chart showing the diffusion depths of two index altering material used to form an optical device of the present type.

In accordance with the present invention, a method for fabricating a plurality of optical waveguides on a substrate comprises applying two process, each diffusing a different index altering material into the substrate. At least one waveguide is formed using each process and material. The first process requires a significantly higher temperature than the second process, so that approximately none of the first material continues to diffuse during the second process.

Certain diffusion processes require a large activation energy (Ea), such as Titanium indiffusion into a substrate of $LiNbO_3$ or $LiTaO_3$. Other processes, such as annealed proton exchange (APE) into $LiNbO_3$, require a smaller activation energy. Diffusion of atoms into solids is governed by the Arrhenius Law of Thermal Activation:

$$D = D_0 e^{(-Ea/kT)}$$

where:

D is known as the diffusion coefficient;

$D_0$ is a temperature-independent diffusion constant;

Ea is the activation energy;

k is Boltzman's constant; and

T is the absolute diffusion temperature.

Generally, for a finite diffusion source the concentration of the diffusant material follows a Gaussian distribution from a maximal concentration at the substrate surface to a diffusion depth d:

$$d = 2\mathrm{sqrt}\,(Dt)$$

where:

t is diffusion time.

Accordingly, the diffusion of a material to a prescribed depth into a substrate depends exponentially on the ratio of activation energy to temperature, and depends on the square root of time and the diffusion constant.

Values for $E_a$ and $D_0$ for Titanium indiffusion and APE are disclosed in, for example, *IEEE J. Quantum Elec.*, G. J. Griffiths and R. J. Esdaile, Vol. QE-20, No. 2, February 1984 and *J. Lightwave Tech.*, K. M. Kissa, P. G. Suchoski and D. K. Lewis, Vol. 13, No. 7, July 1995, both of which are incorporated herein by reference. These values are also shown in Table 1 below.

TABLE 1

|  | Ti into LiNbO3 | APE into LiNbO3 |
| --- | --- | --- |
| $D_0$ (cm$^2$/s) | $1.83 \cdot 10^{-2}$ | $2.16 \cdot 10^{-1}$ |
| Ea (eV) | 2.80 | 1.34 |
| Approx. Diffusion Temp. (°C.) | 1000 | 400 |

Table 2 is a comparison of APE and Ti diffusion depths at APE process time (4hrs) with respect to Temperature:

TABLE 2

$k = 1.38 \cdot 10^{-23}$    $Eape = 1.34 \cdot 1.6 \cdot 10^{-19}$    $Eti = 2.80 \cdot 1.6 \cdot 10^{-19}$
$t = 4 \cdot 60 \cdot 60$    $D0ape = 0.0183$    $D0ti = 0.216$
$T = 300, 301 .. 1000$ $$Dape(T) = D0ape \cdot \exp\frac{(Eape)}{(k \cdot T)}$$

$$Dti = D0ti \cdot \exp\frac{(Eti)}{(k \cdot T)}$$

$$dape(T) = 2 \cdot \sqrt{Dape(T) \cdot t} \cdot 10^6$$

microns $$dti(T) = 2 \cdot \sqrt{Dti(T) \cdot t} \cdot 10^6$$

The significant differences in activation energy shown above result in the significant differences in approximate diffusion temperatures to establish a desired diffusion depth. Accordingly, exposure to the temperature required for APE (Hydrogen diffusion) does not significantly affect previously-diffused Titanium in the substrate. Assuming Gaussian distributions, the ratio of the diffusion depths for Titanium and APE processes at the diffusion temperature for APE is:

$$d_{APE}/d_{Ti} = sqrt\{(t_{APE} * D0_{APE}/t_{Ti} * D0_{Ti})^* \exp((Ea_{Ti} - Ea_{APE})/k * T_{APE}\}$$

With $T_{APE}=673°$ K., and $t_{APE}/t_{Ti} \approx 1.0$:

$$d_{APE}/d_{Ti} = 8.4 \cdot 10^4$$

As shown in the chart 10 of FIG. 1, a curve 12 represents the diffusion depth of Titanium and a curve 14 represents the diffusion depth of Hydrogen with the APE process as a function of temperature. For a temperature $T_1$, the diffusion depth $d_2$ of the Hydrogen is significantly greater than the diffusion depth $d_1$ of the Titanium.

At the maximum temperature of the APE process, the diffusion depth for previously-diffused Titanium is approximately five orders of magnitude less than for the Hydrogen diffused during the APE process. Thus, the Titanium atoms are approximately immobile during a subsequent APE process, and a waveguide formed of the Titanium thus remains effectively unchanged during the APE process.

Figure 2:
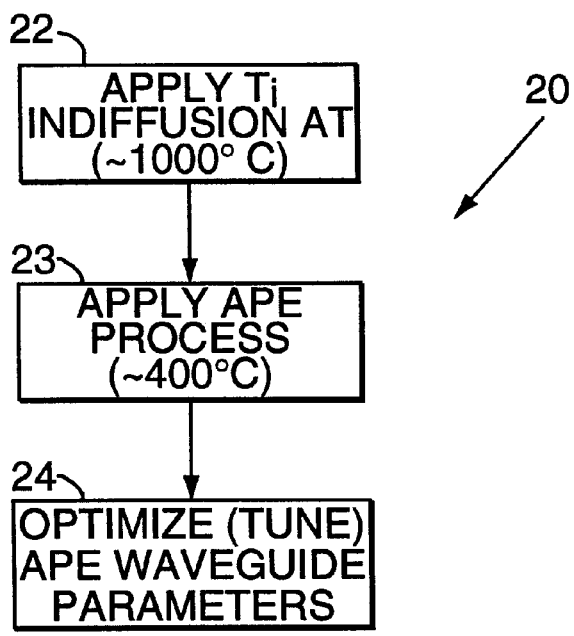
FIG. 2 is a flowchart illustrating a fabrication process provided in accordance with the present invention.

A preferred process provided in accordance with the present invention is illustrated by the flowchart 20 of FIG. 2. A first waveguide is first formed using the Titanium indiffusion process at approximately 1000° C. (step 22). Then, a second waveguide is formed using the APE process at approximately 400° C. (step 23). The parameters for the second waveguide are, at step 24, optimized in view of the dimensions and other optical parameters of the first waveguide. The present invention allows the adjustment in the values of the optical parameters of the second waveguide during and/or following the second material diffusing step, thereby tuning the second waveguide with respect to the first guide. With the present invention, for N optical directional couplers to be fabricated on a given substrate, one or more are fabricated with the higher temperature process and the remaining can be made with the lower temperature process to allow for the parameter tuning noted above.

The process in accordance with the present invention results in improved yield since two optical directional couplers may be more precisely set to optimum values. One coupler may be independently "tuned" (dimensions adjusted) without affecting the other, significantly reducing the difficulty in repeatably fabricating multiple couplers accurately on a common substrate. If $A=a^N$ describes the net yield of a device incorporating N directional couplers each with an individual fabrication yield of "a", where $a \leq 1.0$, then the present invention is expected to increase net yield from $A=a^N$ to $A=a^{(N-1)}$.

Figure 5:
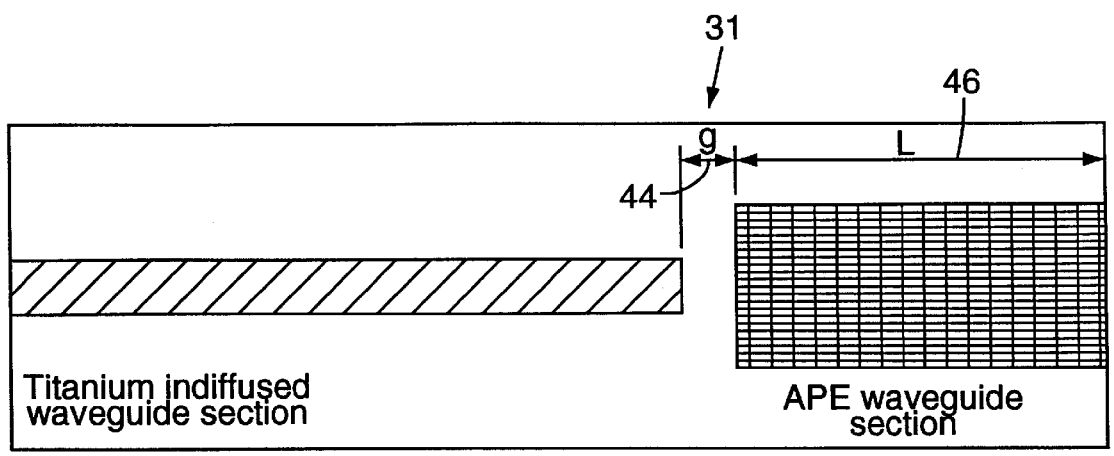
FIG. 5 is a schematic illustration of an optical device formed with an optical stitch provided in accordance with the present invention.

In an optical device having waveguide sections formed from different materials, an interface between waveguide sections is known as a "stitch". The stitch must be formed properly, or the ratio of output optical power to input optical power for the optical device may be undesirably low. In one embodiment of the present invention, illustrated in FIG. 3, a first waveguide 30 is formed on a substrate 32 using the Titanium indiffusion process, and a second waveguide 34 is thereafter formed using the APE process adjacent the waveguide 30. A stitch 31 between the two waveguides is shown schematically in more detail in FIG. 5. The stitch has a gap separation 44 (g) and a length 46 (L) of the APE waveguide section 34. For a single-mode waveguide for 1550 nm wavelengths, the preferable dimensions are g=0 and $L \geq 2$ mm to minimize stitch-induced optical power loss.

Figure 3:
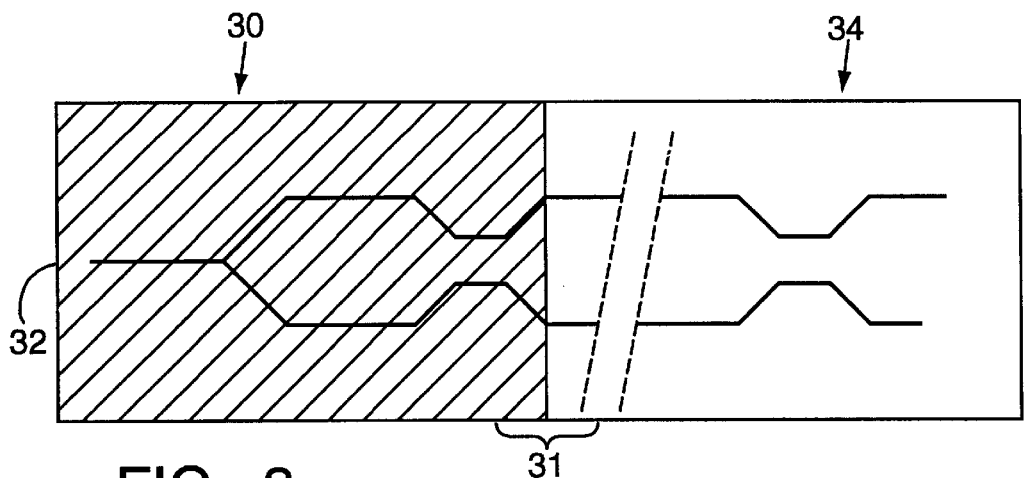
FIG. 3 is a schematic illustration of an optical device formed with the process outlined in FIG. 2.

An advantage to the embodiment illustrated in FIG. 3 is that the APE process produces waveguides which polarize input optical energy in a single polarization state: TE or TM. In the APE process, the exchange of Lithium for Hydrogen increases the refractive index in $LiNbO_3$ in one orthogonal direction, along the optic axis. Thus, if an optical input has a component with improper polarization, the component is not transmitted, and is thus filtered out. By contrast, a waveguide formed by the Titanium indiffusion process would not thus filter such erroneous input components, and noise would be introduced into the optical device. An APE waveguide with a length L of 2 mm provides an average attenuation of 20 dB of optical components with erroneous polarizations.

Figure 4:
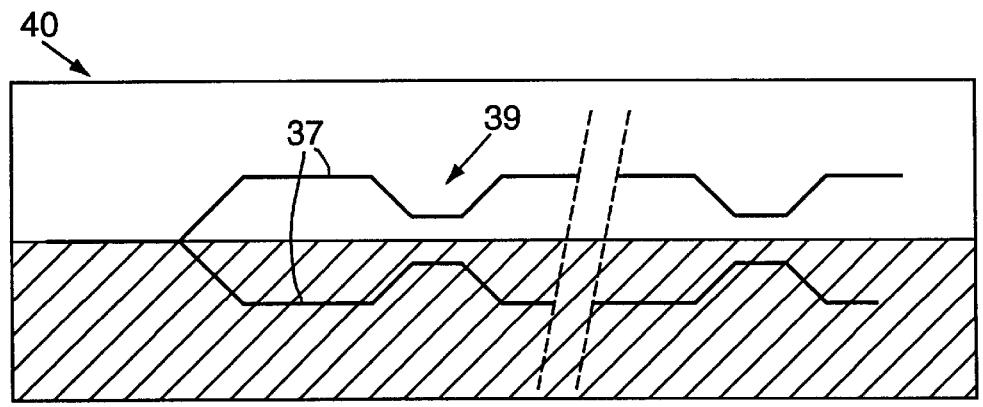
FIG. 4 is a schematic illustration of an optical device formed with another fabrication process provided in accordance with the present invention.

In another embodiment of the present invention illustrated in FIG. 4, each arm 37 of the coupler 39 is formed by a different diffusion process. A first waveguide 40 is formed from, for example, the Titanium indiffusion process, and a second waveguide 42 is formed from the APE process.

Although the invention has been shown and described with respect to a preferred embodiment thereof, it would be understood by those skilled in the art that other various changes, omissions and additions thereto may be made without departing from the spirit and scope of the present invention.

What is claimed is:

1. A method for fabricating, on a substrate, a plurality of optical devices adapted to receive an optical beam, with each optical device defined by a plurality of optical parameters which are determined by fabrication parameters including a waveguide gap separation ("g"), diffusion time ("t") and diffusion temperature ("T"), said method comprising the steps of:

diffusing a first material at a first temperature into a first portion of the substrate to define a first waveguide for the optical beam, said first material diffusing into said substrate only at temperatures comparable to or greater than said first temperature; and diffusing a second material into a second portion of the substrate at a second temperature to define a second waveguide for the optical beam, said second temperature being substantially less than said first temperature such that effectively none of the first material diffuses while the second material diffuses into the substrate.

2. The method of claim 1 further comprising the steps of adjusting the values of the optical parameters of said second waveguide during said second material diffusing step or subsequent steps, thereby tuning the second waveguide with respect to the first waveguide.

3. The method of claim 1, wherein the first material diffusing step further comprises the step of diffusing Titanium into the substrate.

4. The method of claim 1, wherein the second material diffusing step of further comprises an annealed proton exchange process for diffusing Hydrogen into the substrate.

5. The method of claim 4 wherein the optical beam includes a plurality of optical components each having a polarization, including a preferred polarization, said method further comprising the step of attenuating in said second waveguide all of said optical components other than the optical component having said preferred polarization.

6. The method of claim 4, further comprising the step of forming said first and second waveguides into an arm of an integrated optical directional coupler.

7. The method of claim 1 further comprising the step of defining said second substrate portion of the substrate to be adjacent said first substrate portion and to receive the optical beam directly from said first waveguide so that the boundary between the first and second substrate portions bisects one or more of the optical devices which can be optical directional couplers.

8. The method of claim 7 further comprising the step of defining an interface substrate portion between said first and second substrate portions, said interface substrate portion having a gap separation defined between said first and second waveguides and a minimum second waveguide length, thereby establishing an optical stitch.

9. The method of claim 1 further comprising the step of defining said second substrate portion of the substrate to be adjacent said first substrate portion and to receive the optical beam substantially simultaneously with said first waveguide so that the boundary between the first and second substrate portions is placed in between discreet optical devices which can be optical directional couplers.

10. An article made in accordance with a method for fabricating, on a substrate, a plurality of optical devices adapted to receive an optical beam, with each optical device defined by a plurality of optical parameters which are determined by fabrication parameters including a waveguide gap separation ("g"), diffusion time ("t") and diffusion temperature ("T"), said method comprising the steps of:

diffusing a first material at a first temperature into a first portion of the substrate to define a first waveguide for the optical beam, said first material diffusing into said substrate only at temperatures comparable to or greater than said first temperature; and diffusing a second material into a second portion of the substrate at a second temperature to define a second waveguide for the optical beam, said second temperature being substantially less than said first temperature such that effectively none of the first material diffuses while the second material diffuses into the substrate.

11. The article of claim 10 further comprising the step of defining said substrate portion of the substrate to be adjacent said first substrate portion and to receive the optical beam directly from said first waveguide so that the boundary between the first and second substrate portions bisects one or more of the optical devices which can be optical directional couplers.

12. The article of claim 10 further comprising the step of defining said substrate portion of the substrate to be adjacent said first substrate portion and to receive the optical beam substantially simultaneously with said first waveguide so that the boundary between the first and second substrate portions is placed in between discreet optical devices which can be optical directional couplers.

13. The article of claim 11 further comprising the step of defining an interface substrate portion between said first and second substrate portions, said interface substrate portion having a gap separation between said first and second waveguides and a minimum second waveguide length, thereby establishing an optical stitch.

14. The article of claim 13 wherein said first and second waveguides are single mode for a 1530 nm to 1560 nm optical beam, said gap separation is approximately equal to zero and said minimum second waveguide length is at least equal to 2 mm.

15. The method of claim 10 wherein the optical beam includes a plurality of optical components each having a polarization, including a preferred polarization, said method further comprising the step of attenuating in said second waveguide all of said optical components other than the optical component having said preferred polarization.

16. The article of claim 15 wherein said second waveguide provides an average attenuation of 20 db of all optical components other than the optical component having said preferred polarization.

* * * * *

UNITED STATES PATENT AND TRADEMARK OFFICE
CERTIFICATE OF CORRECTION

PATENT NO. : 5,982,964
DATED : November 9, 1999
INVENTOR(S) : Marx et al.

It is certified that error appears in the above-identified patent and that said Letters Patent is hereby corrected as shown below:

Column 1, line 11, delete "is";
column 1, line 14, delete "is";
column 1, line 18, delete "is";
column 2, line 2, delete "and";
column 2, line 12, change "affect" to --effect--;
column 3, line 48, change "material" to --materials--;
column 3, line 65, change "process" to --processes--;
column 5, line 9, insert -- ) -- after "T$_{APE}$";
column 5, line 56, change "A=a$^{(N-1)}$" to --A=a$^{(N-1)}$--; and
claim 15, line 1, change "method" to --article--.

Signed and Sealed this

Fifteenth Day of August, 2000

Attest:

Q. TODD DICKINSON

Attesting Officer

Director of Patents and Trademarks